United States Patent [19]

Machcinski

[11] Patent Number: 4,665,725
[45] Date of Patent: May 19, 1987

[54] VEHICLE ANTI-THEFT SYSTEM

[76] Inventor: Edmund F. Machcinski, 20635 Middlebelt Rd., Romulus, Mich. 48174

[21] Appl. No.: 778,844

[22] Filed: Sep. 23, 1985

[51] Int. Cl.$^4$ .............. F02B 77/00; E05B 65/12; F16C 1/10
[52] U.S. Cl. .............. 70/255; 180/287; 180/165; 74/501 R; 74/502; 70/312; 123/198 B
[58] Field of Search .............. 70/255, 207, 239, 241, 70/257; 74/500.5, 501.5 R, 501.5 H, 501.6, 502; 180/173, 271, 287, 272; 123/198 B

[56] References Cited

U.S. PATENT DOCUMENTS

| | | | |
|---|---|---|---|
| 1,322,171 | 11/1919 | Wherry | 180/287 |
| 1,857,654 | 5/1932 | Mylar | 70/165 |
| 2,056,549 | 10/1936 | Weinberg | 74/502 |
| 2,503,449 | 4/1950 | Murray | 180/287 |
| 3,782,493 | 1/1974 | Lipschutz et al. | 180/287 |
| 3,820,361 | 6/1974 | Leitner | 70/312 |
| 4,033,158 | 7/1977 | Chamberlain et al. | 180/287 |
| 4,309,740 | 1/1982 | Takata | 74/502 |
| 4,329,953 | 5/1982 | Row | 180/287 |
| 4,560,026 | 12/1985 | Yanagisawa et al. | 180/287 |

FOREIGN PATENT DOCUMENTS

| | | | |
|---|---|---|---|
| 594942 | 1/1932 | Fed. Rep. of Germany | 180/287 |
| 415224 | 9/1946 | Italy | 180/287 |

*Primary Examiner*—Gary L. Smith
*Assistant Examiner*—Vinh Luong
*Attorney, Agent, or Firm*—Charles W. Chandler

[57] ABSTRACT

An anti-theft system for a vehicle having a starter motor with a pinion for engaging the flywheel of the vehicle's engine to start it. A sleeve is mounted on the starter motor shaft so as to be slideably moveable between a disabling position in which the sleeve is disposed in the path of motion of the pinion to prevent it from engaging the flywheel, and a retracted position in which the sleeve is spaced from the pinion to permit its normal operation. A metal sheathed cable is so connected between the sleeve and a handle mounted in the vehicle's passenger compartment to permit the user either to disable the starter motor or to permit its normal operation.

10 Claims, 3 Drawing Figures

VEHICLE ANTI-THEFT SYSTEM

BACKGROUND OF THE INVENTION

This invention is related to vehicle anti-theft systems and more particularly to a system for mechanically preventing the pinion gear of a vehicle starter motor from engaging the flywheel unless the user unlocks a handle in the vehicle's passenger compartment and then moves the handle so as to release the starter motor pinion for its starting motion.

There are many anti-theft systems disclosed in the prior art for attempting to prevent thieves from stealing an automobile. Many of these systems disclose some sort of means for interrupting the vehicle's electrical circuitry so as to prevent the vehicle ignition or other electrical circuit from being employed from starting the engine unless the user performs certain predetermined steps such as operating a coding system, a hidden switch or the like.

SUMMARY OF THE INVENTION

The broad purpose of the present invention is to provide means for disabling the vehicle's starter motor unless the user moves a handle in the passenger compartment to permit the movement of the starter motor pinion gear toward its engine starting position.

The preferred embodiment of the invention, which will be described in greater detail, employs a starter motor located within the flywheel housing of the vehicle. The pinion is mounted in the conventional manner on the starter motor shaft. When the starter motor is electrically energized, the pinion is movable longitudinally on the shaft to a position in which it engages the engine flywheel to rotate it.

A sleeve is mounted on the end of the starter motor shaft. The sleeve is moveable to a disabling position adjacent the pinion to prevent it from being moved to its starting position.

A steel sheathed cable is mounted between the flywheel housing and the passenger compartment. A handle on the end of the cable in the passenger compartment permits the user to move the cable in the sheath. The opposite end of the cable in the flywheel housing is engageable with the sleeve to move it toward the pinion.

A key-operated locking means in the passenger compartment engages the handle to prevent the cable from being moved to its release position unless the user manipulates an appropriate key. When released, the handle can be used to move the cable away from the pinion thereby releasing it for a starting motion.

The preferred anti-theft system does not depend upon electrical power for its operation since it is a mechanical system. Further, since it prevents the starter motor pinion from engaging the flywheel, a thief attempting to electrically start the engine by jumping the starter motor will meet with failure.

Still further objects and advantages of the present invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
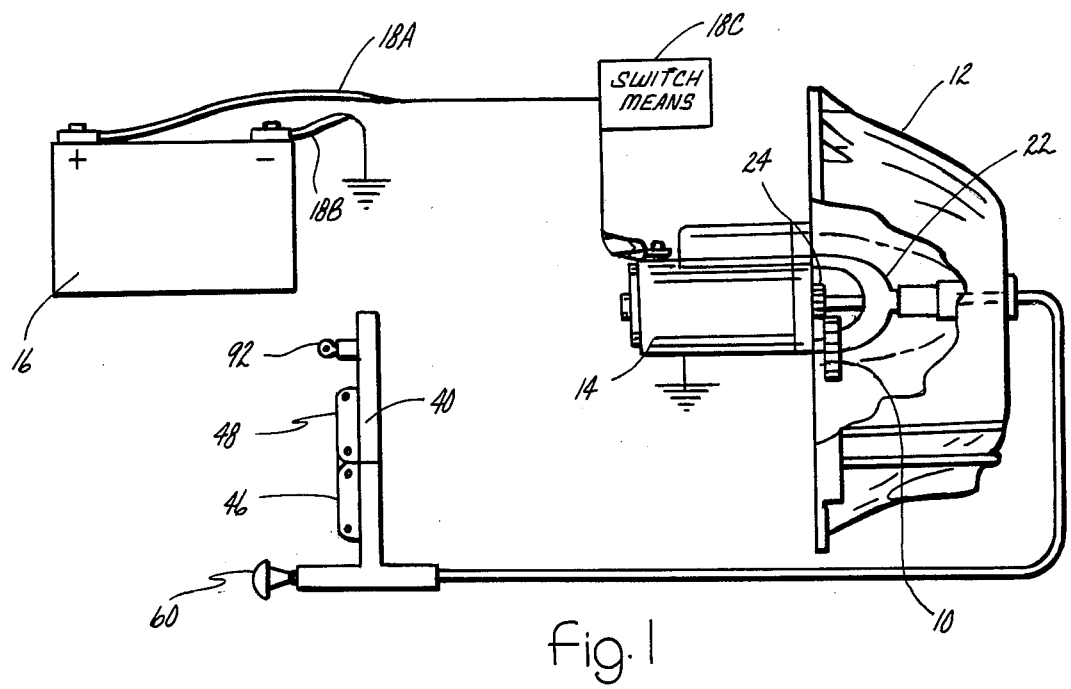
FIG. 1 is a fragmentary view of a vehicle illustrating the starter motor mounted within the flywheel housing.

Referring to the drawing, FIG. 1 illustrates flywheel 10 of a vehicle engine mounted within housing 12. Starter means 14 are at least partially mounted within the housing and adapted to be electrically connected to battery means 16 by electrical conductors 18A and 18B, and switch means 18C.

Figure 2:
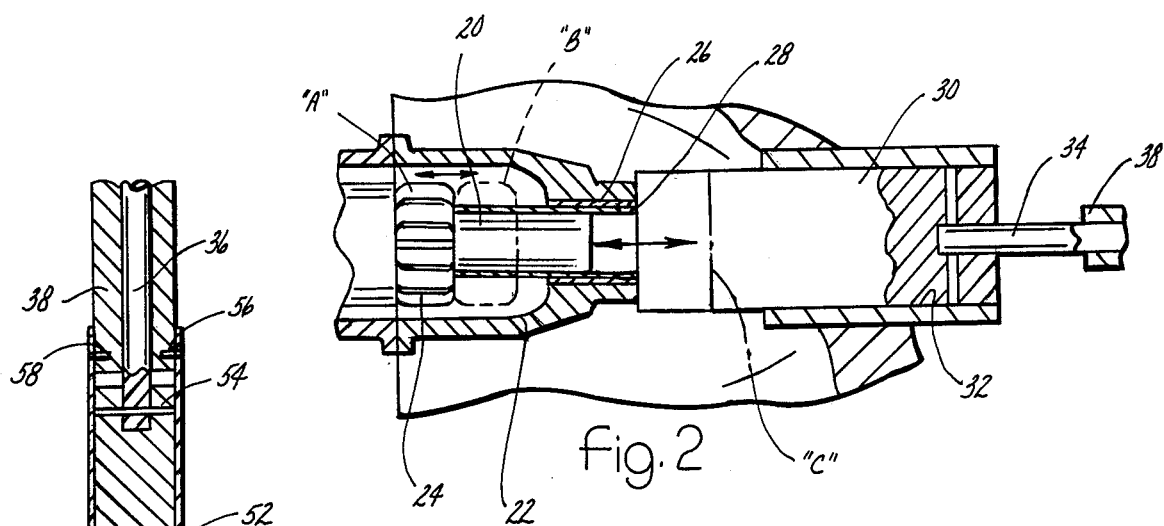
FIG. 2 is an enlarged view of the starter motor pinion gear and the disabling sleeve.

Referring to FIG. 2, the starter means has an armature shaft 20 extending beyond one end of the starter housing. Frame 22 extends over the end of the starter housing. Pinion 24 is mounted on shaft 20 so as to be moveable between a position illustrated at "A" in which the pinion is normally in a non-rotating position, and a position illustrated in phantom at "B", a position in which the pinion is engageable with flywheel 10 to turn it to thereby start the engine. Thus it can be seen that the pinion must move longitudinally on shaft 20 from position "A" to position "B".

Frame 22 supports bushing 26. Sleeve 28 is slideably mounted on shaft 20 within bushing 26. The sleeve is longitudinally moveable along the shaft between a disabling position, illustrated in FIG. 2, and a release position illustrated in phantom at "C". The sleeve is pushed toward position "C" by the pinion as it is moved toward its flywheel-starting position by rotation of the starter motor. Plug 30 is slideably mounted in opening 32 of the flywheel housing and has a diameter sufficient to push the sleeve toward the pinion, that is toward the left as viewed in FIG. 2.

Steel cable 34 has one end connected by roll pin 36 to plug 30. The cable is slideably mounted in steel sheath 38 which extends from the flywheel housing to passenger compartment 40, illustrated in FIG. 3. When the cable is pushed toward the pinion, the plug is operative to push the sleeve toward the pinion to prevent it from being moved toward the flywheel even though the starter shaft is rotating. When the cable is moved in the opposite direction, the cable pulls the plug away from sleeve 28. In this position, the sleeve can be pushed by the pinion, that is, the sleeve does not prevent the pinion from being moved toward the flywheel.

Figure 3:
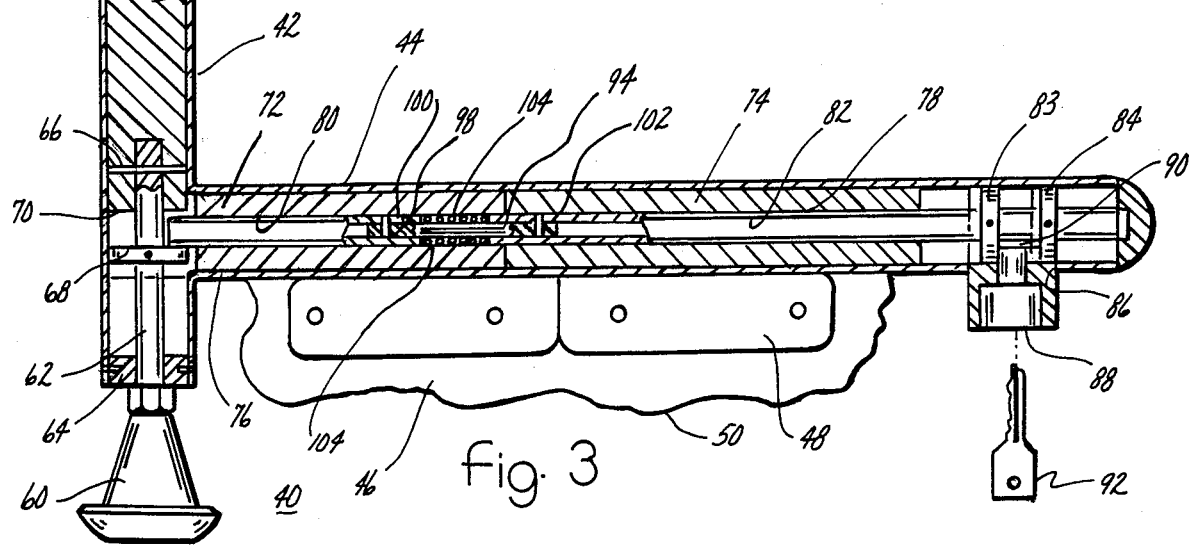
FIG. 3 is an enlarged view of the handle means located in the passenger compartment of the vehicle.

Referring to FIG. 3, a tubular housing 42 is mounted in the passenger compartment. Housing 42 is also connected to locking mechanism housing 44 which is attached by bracket means 46 and 48 to dashboard 50 or other suitable support in the passenger compartment. Plug 52 is slideably mounted in housing 42 and connected by roll pin 54 to cable 36. The sheath is attached by pins 56 and 58 to the housing. Plug 52 is slideably moveable in housing 42 with the cable.

Handle 60 is connected to rod 62. Rod 62 is slideably mounted in cap 64 which is attached to the end of housing 42. The opposite end of rod 62 is attached by roll pin 66 to plug 52.

Collar 68 is pinned to rod 62 and slideably mounted in the housing in a spaced relationship with respect to the end of plug 52 so as to form an annular slot 70 between the rod and the plug. The user can push plug 30 toward sleeve 28 by pushing the handle toward the position illustrated in FIG. 3. The user can pull plug 30 away from sleeve 28 by pulling handle 60 away from housing 42.

Still referring to FIG. 3, a pair of hollow supports 72 and 74 are mounted end to end and fixed to housing 44. A pair of tubular members 76 and 78 are independently, slideably mounted in bores 80 and 82, respectively, of supports 72 and 74. One end of tubular member 76 is receivable into slot 70 to a locking position in which it prevents handle 60 from being pulled with the cable.

A pair of collars 83 and 84 are mounted on tubular member 78 adjacent opening 86. A key-operated mechanism 88 is mounted in opening 86 and has a cam 90 disposed between collars 83 and 84 so that when the key-operated mechanism is turned by key 92 in the conventional manner, tubular member 78 is cammed either toward or away from slot 70 depending upon the direction key 92 is turned.

Rod 94 has one end slideably mounted in the end of tubular member 76 and its opposite end mounted in the end of tubular member 78. Pin 98 is carried by rod 94 and disposed in a slot 100 in tubular member 72 so that rod 94 has a limited degree of longitudinal travel. A second pin 102 connects rod 94 to tubular member 78. Coil spring 104 is wrapped around rod 94 and disposed between the ends of tubular members 76 and 78 to bias them away from one another.

In operation, when key 92 is turned in a locking motion, it cams the two tubes toward the left as viewed in FIG. 3 so that tubular member 76 is biased toward a locking position in slot 70 to prevent motion of handle 60. When the key is turned in the opposite, unlocking direction, it moves tubular member 78 toward the right which through pin 98 and rod 94 bias tubular member 76 away from slot 70. When both tubes are in their unlocking position, and the user turns the key toward its locking position, tubular member 78 will be biased toward tube 76, however, tube 76 will not move into slot 70 unless the slot is aligned with the tube. If the handle has been withdrawn so that plug 52 is disposed in the path of motion of tubular member 76, it will slideably abut the plug until the user pushes the handle toward the pinions disabling position thereby permitting spring 104 to pop the end of tube 76 into slot 70 to lock the handle in position.

Thus it is to be understood that I have described means for mechanically engaging a starter such that it is inoperable to rotate the flywheel of an engine unless the user first unlocks the handle by manipulating key 92 and then moves the handle to move plug 30 to a position which permits the sleeve to be moved out of position as the pin is moved toward the flywheel.

Having described my invention, I claim:

1. In a vehicle, the combination comprising:
   an internal combustion engine;
   a starter motor having a rotatable shaft;
   a pinion longitudinally movable along the starter motor shaft between a first position in which the pinion is operable to engage the engine to start same as the starter motor shaft is being rotated, and a second position in which the pinion is disengaged from the engine;
   disabling means mounted in the vehicle and engagable with the pinion for preventing movement thereof from said second position toward said first position; and
   means for moving the disabling means toward a position in which it is inoperable to prevent movement of the pinion from said second position toward said first position.

2. A combination as defined in claim 1, in which the vehicle has a passenger compartment and including handle means in the passenger compartment connected to the disabling means for moving same such that the pinion is moveable toward said first position.

3. A combination as defined in claim 2, in which the handle means in the passenger compartment includes a handle member, a cable connected to the handle member, and the disabling means includes a sleeve slideably mounted on the starter motor shaft, and including means on the cable engageable with the sleeve for moving same, whereby the sleeve is remotely moveable by manipulating the handle member in the passenger compartment.

4. A combination as defined in claim 3, in which the handle means includes a housing, a handle member connected to the cable, and including a cable sheath connected to the housing such that the cable is moveable therein, and locking means mounted in the housing to prevent motion of the cable with respect to the cable sheath.

5. A combination as defined in claim 4, in which the locking means includes a key-operated locking member.

6. In a vehicle, the combination comprising:
   an internal combustion engine;
   electrically energized starter means, including a rotatable starter motor shaft;
   a starting member mounted on the starting motor shaft so as to be longitudinally movable thereon from a first position toward a second position when the starter means is electrically energized and the shaft is being rotated;
   a disabling member mounted on the starter motor shaft so as to be movable from a first disabling member position in which the disabling member is disposed in the path of longitudinal motion of the starting member to prevent movement thereof from said first starting member position to said second starting member position at such times as the starter means is energized, and a second disabling member position in which the disabling member is inoperable to prevent motion of the starting member from said first starting member position to said second starting member position; and
   handle means for moving the disabling member from said second disabling member position towards said first disabling member position.

7. A combination as defined in claim 6, in which the vehicle includes a flywheel engageable with the starter means, a flywheel housing, and wherein the starter motor means is mounted within the flywheel housing.

8. A combination as defined in claim 6, in which the disabling member is a sleeve slideably mounted on the starter motor shaft.

9. A combination as defined in claim 6 in which the vehicle has a flywheel housing and a flywheel, the starter means is at least partially mounted within the flywheel housing.

10. A combination as defined in claim 9, in which the starting member comprises a pinion engageable with the flywheel to rotate same.

* * * * *